(12) United States Patent
Kuckelkorn

(10) Patent No.: US 7,395,820 B2
(45) Date of Patent: Jul. 8, 2008

(54) RECEIVER TUBE WITH RECEIVER TUBULAR JACKET AND PARABOLIC TROUGH COLLECTOR CONTAINING SAME

(75) Inventor: Thomas Kuckelkorn, Weiden (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/770,211

(22) Filed: Feb. 2, 2004

(65) Prior Publication Data

US 2004/0163640 A1 Aug. 26, 2004

(30) Foreign Application Priority Data

Feb. 3, 2003 (DE) ................................ 103 05 428

(51) Int. Cl.
*F24J 2/08* (2006.01)
*F24J 2/12* (2006.01)
(52) U.S. Cl. ......................... 126/683; 126/694; 126/698
(58) Field of Classification Search ............. 126/683 O, 126/694 X, 698 X, 699
See application file for complete search history.

(56) References Cited

U.S. PATENT DOCUMENTS

| | | | | |
|---|---|---|---|---|
| 3,125,091 A | * | 3/1964 | Sleeper | ......................... 126/624 |
| 4,279,244 A | * | 7/1981 | McAlister | .................... 126/621 |
| 4,505,260 A | * | 3/1985 | Metzger | ....................... 126/637 |
| 4,586,489 A | | 5/1986 | Voll et al. | |
| 5,056,892 A | | 10/1991 | Cobb, Jr. | |
| 5,727,585 A | * | 3/1998 | Daume et al. | ................ 136/246 |

FOREIGN PATENT DOCUMENTS

| | | |
|---|---|---|
| DE | 26 31 412 C2 | 11/1982 |
| DE | 197 18 044 C1 | 9/1998 |
| DE | 198 34 089 C2 | 6/2000 |
| EP | 0 004 060 A1 * | 5/1979 |
| GB | 1 551 94 | 9/1979 |
| WO | 97/00408 | 1/1997 |

OTHER PUBLICATIONS

Hank Proce et al: "Advances in Parabolic Trough Solar . . . ", In Journal of solar Energy Engineering, May 2002, vol. 124, pp. 109-125.

* cited by examiner

*Primary Examiner*—Alfred Basichas
(74) *Attorney, Agent, or Firm*—Michael J. Striker

(57) ABSTRACT

The parabolic trough collector includes a single-axis parabolic mirror (1) and a receiver tube (2) arranged at the focal point (F) of the parabolic mirror (1). The receiver tube (2) includes an absorber tube (4) and an outer tubular glass jacket (3) around it. To compensate for focusing errors in the parabolic collector and thus to reduce associated geometric optical losses, the tubular jacket (3) is provided with structural elements (9*a*, 9*b*, 9*c*, 9*d*), which focus sunlight reflected from the mirror as well as sunlight that falls directly on the receiver tube from the sun on the absorber tube. The receiver tube is preferably arranged relative to the parabolic mirror, so that its center is displaced from the focal point (F) by a distance equal to half the spacing between the tubular jacket (3) and the absorber tube (4).

23 Claims, 7 Drawing Sheets

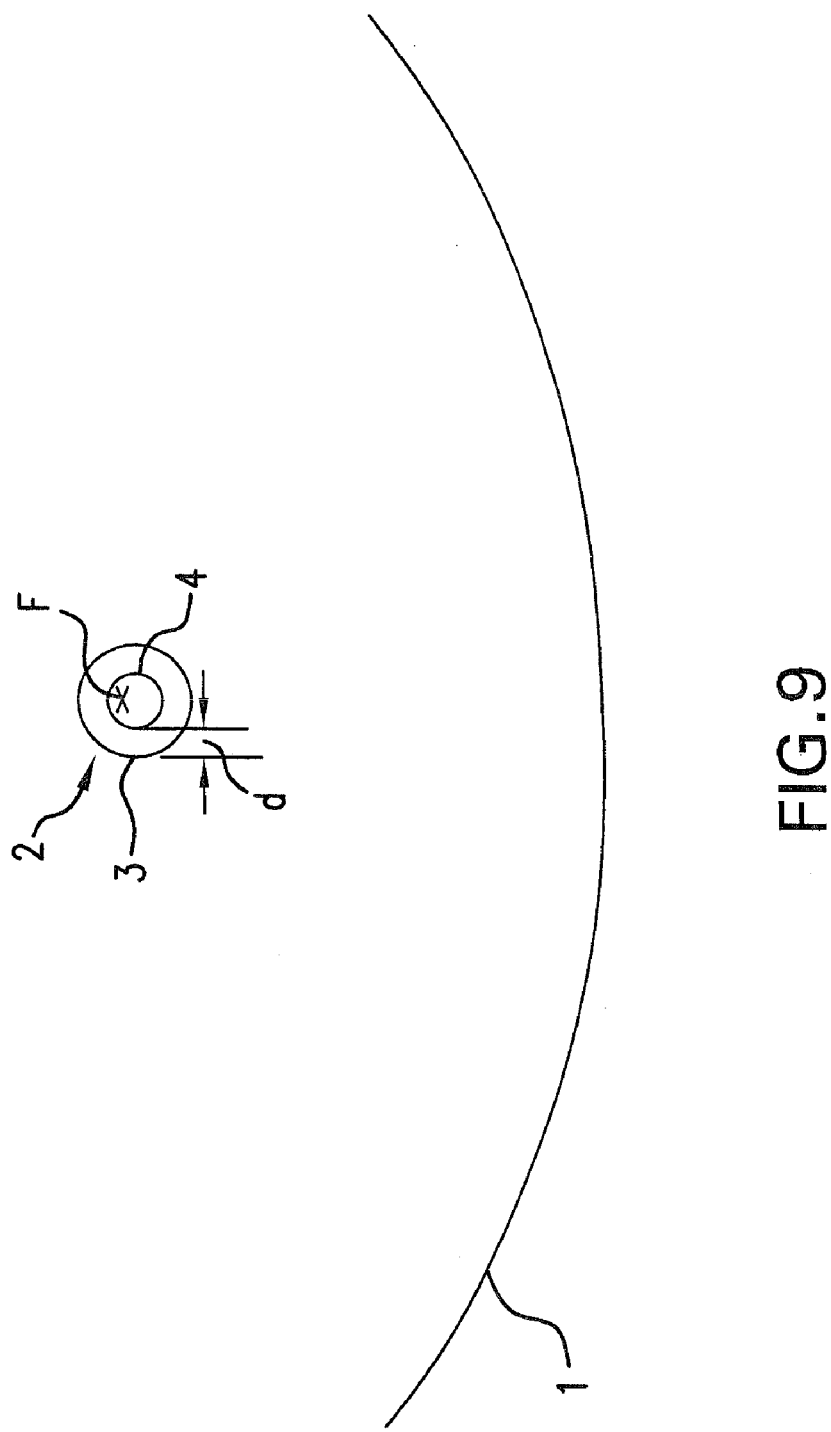

RECEIVER TUBE WITH RECEIVER TUBULAR JACKET AND PARABOLIC TROUGH COLLECTOR CONTAINING SAME

BACKGROUND OF THE INVENTION

The present invention relates to a tubular jacket for an absorber tube of a solar energy collector, especially a parabolic trough collector. The invention also relates to a parabolic trough collector for solar energy and a receiver tube for it.

A known parabolic trough collector comprises a single axis parabolic mirror and a receiver tube, which is arranged at the focus of the parabolic mirror. The mirror usually has a width of from 5 to 6 m. The receiver tube comprises a preferably radiation selective inner tube section, which is also called the absorber tube, and an outer tubular jacket made of glass for insulation. Mirror and receiver tube are directed toward the sun, so that the solar radiation always is directed normal to the aperture plane and ideally the radiation falling on the mirror is guided to the receiver tube.

Focusing errors and thus geometrically dependent optical losses occur in parabolic trough collectors due to various factors. For example, the mirror elements have a certain total shape tolerance or also waviness, which leads to focusing errors. The positioning of the mirror elements during assembly is only possible within certain tolerances. Also self-deformation, manufacturing and assembly tolerances of the steel structure, on which the parabolic trough collector is built, must be considered. Last, but not least, wind occurring in the vicinity of the parabolic trough collector leads to deformation of the entire structure and thus to focusing errors.

Currently attempts have been made to minimize optical losses by defocusing with the help of secondary concentrators mounted on the receiver tube. Already there has been an experimental use of a secondary planar reflector. An additional arrangement of a parabolic mirror with a secondary concentrator in the form of a metallic reflector has been described in WO 97/00408. A zig-zag-shaped metal sheet has been used as a secondary concentrator according to H. Price, et al, Journal of Solar Energy Engineering, Volume 124, p. 109-125 (2002).

When a highly reflective material, e.g. a polished metal sheet, is used for the secondary concentrator, it is important to put it in the tubular jacket in a vacuum, in order to protect it from dirt and aging. The secondary concentrator can be mounted either on the tubular jacket or on the absorber tube. The absorber tube is shaded by mounting the secondary concentrator above the absorber tube on the side facing away from the mirror. When the secondary concentrator is wider than the absorber tube, also a part of the mirror is shaded. If the secondary concentrator is attached to the tubular jacket, a part of the radiation, which falls on the side of the secondary concentrator facing away from the mirror, is lost, since the tubular jacket and the absorber tube are thermally decoupled. It is possible to use a portion of this radiation when the secondary concentrator is attached to the absorber tube and is made absorbing on the side facing away from the mirror. Because of that feature more radiation can be utilized. At the same time however the increase in the absorber surface area increases the thermal losses.

The increase of the interceptor factor (the fraction of the radiation, which falls on the absorber tube), which is achieved by the secondary concentrator, is necessarily accompanied with radiation losses on account of the above-mentioned disadvantages. No significant improvement of the interceptor factor may therefore be achieved in total.

SUMMARY OF THE INVENTION

It is an object of the present invention to provide a tubular jacket for a parabolic trough collector, which helps to provide the highest possible interceptor factor, thus increasing the amount of solar energy that is collected.

It is another object of the present invention to provide a receiver tube for a parabolic trough collector, which helps to collect more solar radiation than conventional receiver tubes of the prior art and has the highest possible interceptor factor.

It is a further object of the present invention to provide a parabolic trough collector for solar energy, which has a receiver tube with the highest possible interceptor factor.

According to the present invention the tubular jacket or jacket tube for a parabolic trough collector has structural elements, which focus sunlight on an absorber tube arranged in the tubular jacket or jacket tube, by deflection and/or detraction of the sunlight.

According to the present invention a receiver tube for a parabolic trough collector comprises a tubular jacket and an absorber tube arranged in the tubular jacket. The tubular jacket has structural elements, which focus sunlight on the absorber tube arranged in the tubular jacket, by deflecting and/or defracting sunlight.

According to the present invention the parabolic trough collector for solar energy comprises a parabolic mirror having a focal point and a receiver tube arranged at the focal point of the parabolic mirror. The receiver tube comprises an absorber tube and a tubular jacket around the absorber tube, wherein the tubular jacket comprises structural elements, which focus sunlight on the absorber tube arranged in it, by deflecting and/or detracting sunlight.

Because of the focusing structural elements in the tubular jacket, radiation, which would enter from a certain angular range through a smooth or unstructured tubular jacket and leave again without impinging on the absorber tube, now is directly guided to the absorber tube surface. This especially concerns rays, which come to the tubular jacket from the outside region of the parabolic mirror, as well as rays, which impinge directly on the tubular jacket from the sun. The structural elements of the tubular jacket are preferably formed to particular focus the rays that reach the tubular jacket from the outer region of the parabolic mirror on the absorber tube. The optical structuring of the tubular jacket causes an optical widening of the absorber tube similar to a magnifying effect for the above-mentioned angular range. Depending on the size and spatial distribution of the mirror errors an increase of the optical efficiency of about 1 to 3% can be achieved.

With larger mirror and assembly errors the increase of the optical efficiency can turn out to be still higher. The use of a tubular jacket according to the invention can also accommodate higher tolerances in mirror manufacture and assembly, which leads to clearly reduced costs.

An additional advantage of the tubular jacket according to the invention is that the thermal load is distributed somewhat uniformly over the absorber tube. Parabolic trough collectors have the undesirable property that the side of the absorber tube facing the mirror is many times more strongly irradiated than the side facing away from the mirror. Because of this property usually temperature gradients arise over the tube circumference, which lead again to material stress and deformation. Because of the focusing, especially of the rays falling directly on the tubular jacket and rays that are axially remote from the absorber tube, the side of the absorber tube facing away from the mirror is somewhat more strongly irradiated when the tubular jacket according to the invention is used.

The focusing structural elements of the tubular jacket advantageously can be a plurality of lenses, a plurality of polyhedrons, and especially preferably a plurality of prisms. These types of optical elements have the property of focusing on the interior of the tubular jacket and thus on the absorber tube.

The focusing structural elements can be provided by a suitably structured foil, which is mounted on the inner or outer side of the tubular jacket. The mounting on the outside is changed more easily from a manufacturing engineering standpoint. In order to protect the foil from weathering effects and dirt the foil can be attached to the inner side of the tubular jacket prior to assembly. When the foil is to be attached, the fact that the foil is optically coupled to the tubular jacket should be considered. It can, for example, be glued or laminated.

In a preferred embodiment the tubular jacket is a drawn glass tube. The focusing structural elements are constant or do not change in the longitudinal direction along the tubular jacket in the drawn glass tube. Lens-shaped structural elements are obtained e.g. by a wavy structuring of the inner and/or outer wall of the glass tube. Prismatic or prism-shaped structural elements were obtained by a substantially zig-zag structuring of the inner and/or outer wall of the glass tube. In practice with the prismatic structural elements a rounding off of the prisms can be avoided only to the extent of the current engineering capabilities.

Preferably the tubular jacket has an antireflective coating on at least one of the inner side and outer side. Because of that it is guaranteed that a maximum portion of the radiation impinging on the tubular jacket is guided to the absorber tube and not reflected to the outside.

It has proven advantageous to provide structured regions only over at least one segment. For example, the structuring is interrupted at least partially in the region in which the radiation falls directly on the absorber tube without deflection by the focusing structural elements of the tubular jacket on the side facing the sun. An arrangement in which the structural elements are provided in the tubular jacket symmetrically in two strips on respective opposite sides of the normal axis of the parabolic mirror in angular regions of 20° to 105°, especially of 35° to 65°, is particularly preferred.

In a preferred embodiment of the parabolic trough collector the receiver tube is displaced somewhat relative to the focal point in the direction of the parabolic mirror by a distance equal to about half the spacing between the tubular jacket and the absorber tube. Because of that displacement losses from radiation, which misses the absorber tube, in that it passes under the receiver tube, namely between the receiver tube and the mirror, are reduced. The result is that thermal load is distributed more equally over the absorber tube, so that a smaller temperature gradient over the tube circumference, and thus smaller deformation and material stresses, result.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which:

FIG. 9 is a cross-sectional view through a parabolic trough collector having a receiver tube with a tubular jacket according to the invention.

DESCRIPTION OF THE PREFERRED EMBODIMENTS

Figure 1:
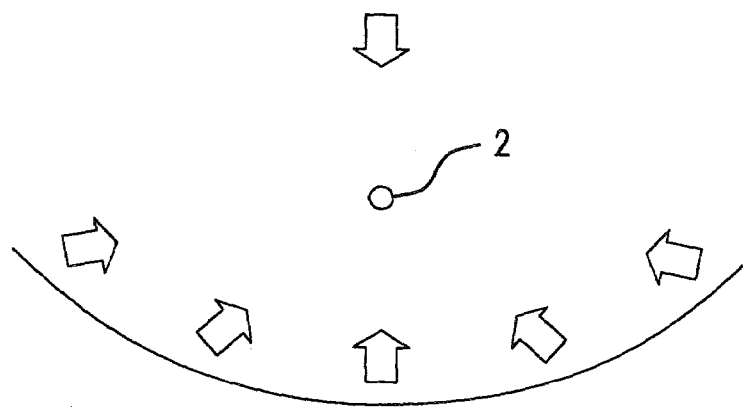
FIG. 1 is a schematic cross-sectional view of a parabolic trough collector.

In FIG. 1 a parabolic mirror 1 and a receiver tube 2 are illustrated. The receiver tube 2 is arranged at the focus of the parabolic mirror 1 in the arrangement shown in FIG. 1. Incident radiation on the side of the receiver tube facing the sun always impinges in the normal direction, since the mirror 1 and the receiver tube 2 are pointed exactly toward the position of the sun. Radiation impinges at an angle between 160° and 180° on the side of the receiver tube 2 facing the mirror. The arrows in FIG. 1 show the incidence angles.

Figure 2:
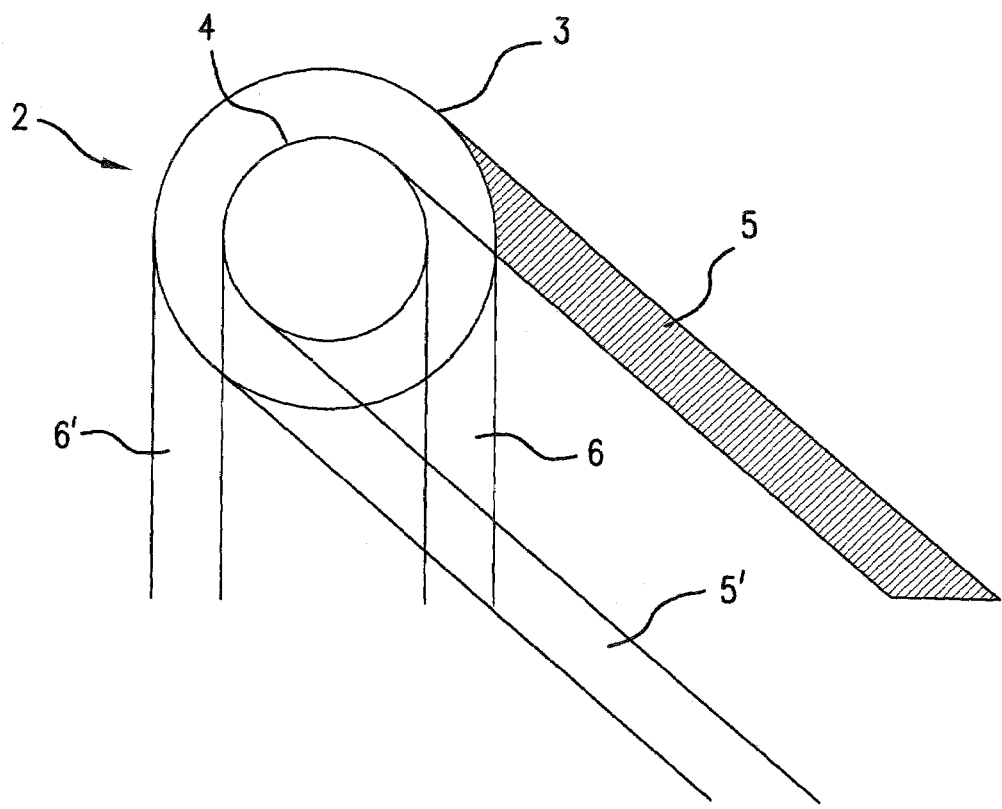
FIG. 2 is a diagrammatic cross-sectional view of the path of a radiation beam traveling in a receiver tube of a parabolic trough collector.

In FIG. 2 a conventional receiver tube 2 is shown, which comprises an absorber tube 4 and a tubular jacket 3. The radiation beam 5,5' is a beam, which passes comparatively far from the optic axis of the collector, while the radiation beam 6,6' is a beam, which passes comparatively close to the axis. Both beams pass through the tubular jacket 3 without striking the absorber tube 4.

Figure 3:
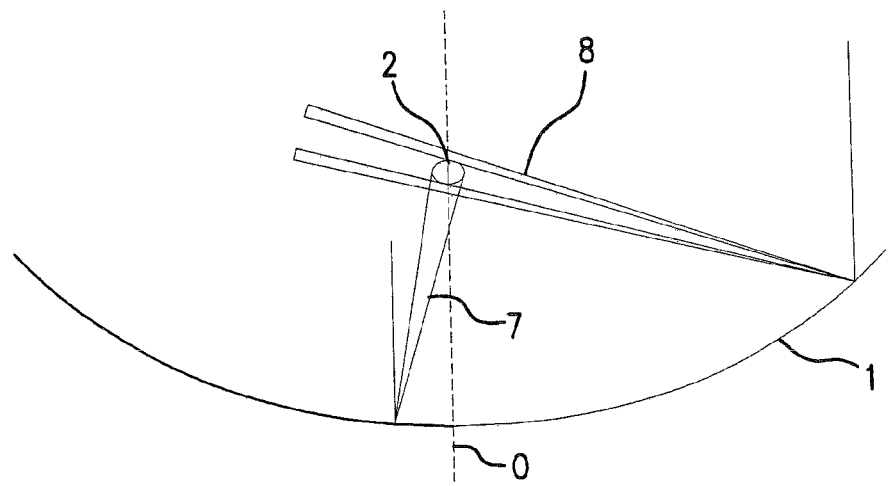
FIG. 3 is a diagrammatic cross-sectional view of the path of radiation in a parabolic trough collector showing the origin of focusing errors.

In FIG. 3 the focussing error due to mirror deformation is illustrated by example. The losses arise principally in the outer region of the parabolic mirror 1, since the error has a greater effect because of the greater distance to the receiver tube 2. Because of the greater distance between the mirror 1 and the receiver tube 2 an incident beam spreads to a greater beam cross-section in the case of a comparatively far beam 8 (as measured with respect to the optic axis O) than in the case of a comparatively near beam 7. As usual the deformation of the mirror 1 is greater at the edges of the mirror than at its center because of the undesirable load distribution. The mirror error additionally increases with increasing distance from the optical axis O because of that. The focusing error has diverse consequences. Radiation beam 8, which falls on the tubular jacket 3 from the edge region of the mirror, passes through it to a part on the upper side facing away from the mirror. Radiation beam 7, which is directed at the mirror center, falls on the receiver tube 2 almost without any losses. Beams, which pass through the tubular jacket 3 before they reach the mirror 1, fall in part on the absorber tube 4. A further part leaves the tubular jacket 3, without falling on the absorber tube 4 and is guided toward the mirror 1. However because of the tubular jacket 3 the beams are partially deflected strongly, so that they miss the absorber tube 4 after reflection at the mirror 1.

Figure 4:
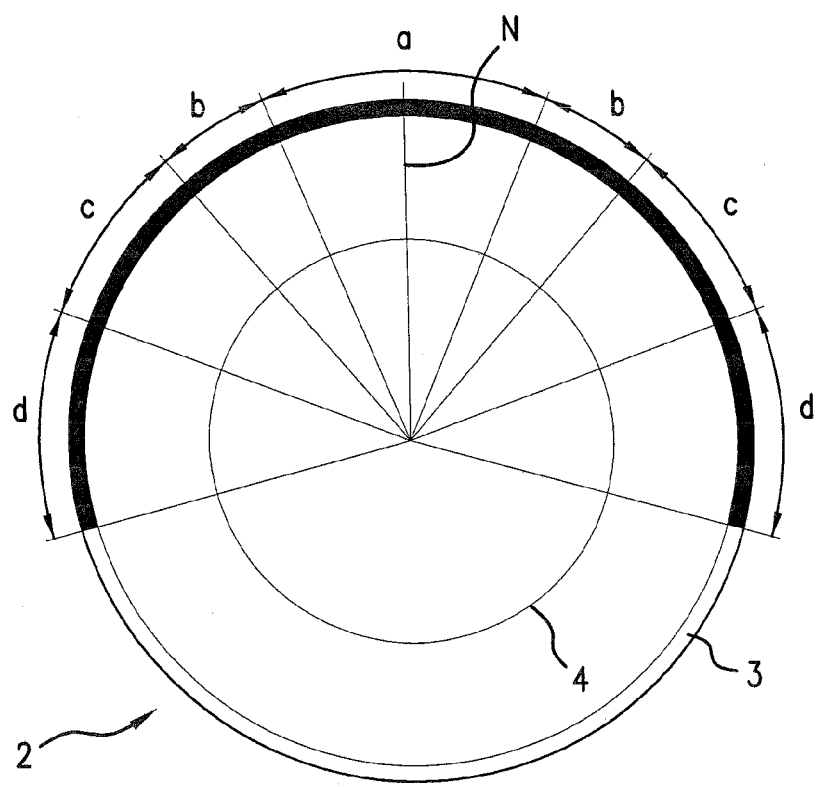
FIG. 4 is a cross-sectional view of a receiver tube with a segmented tubular jacket.

In FIG. 4 a receiver tube 2 is shown, which comprises an absorber tube 4 and a tubular jacket 3 structured in certain segments. In the embodiment shown in FIG. 4 the structuring in the region a of the tubular jacket 3, in which the radiation comes directly from the sun to the absorber tube 4 without additional deflection, is omitted. That is region a is not structured. Moreover the structuring is omitted in the region of the tubular jacket 3 facing the mirror. Since the incoming beam angle space on the side facing the mirror is almost completely filled, no significant increase of the interceptor factor can be achieved by structuring this region. Especially in the lower tubular jacket region, in which the radiation falls on the absorber tube 2 from an angular range near 180°, a small local reduction in the interceptor factor might even result.

It has been shown that at least one segment or region designated by c should be structured, which means the structuring or structure elements should be provided in an angular region of 35° to 65° to the normal axis N of the parabolic mirror surface. An additional increase of the interceptor factor can be achieved when the segments designated by b and d are provided with structural elements or structured. This corresponds to an angular range of 20° to 105° to the normal axis N of the parabolic mirror surface. Assuming a mirror angular error of e.g. 4 to 5 mrad, an increase of interceptor factor of up to 3% may be achieved.

Figure 5A:
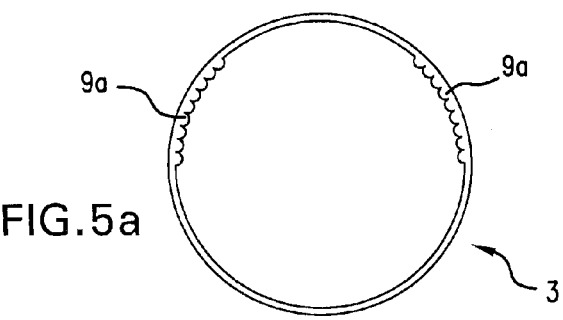
FIGS. 5a, 5b, 5c and 5d are respective cross-sectional views of several embodiments of tubular jackets provided with focussing structural elements according to the invention.
Figure 5B:
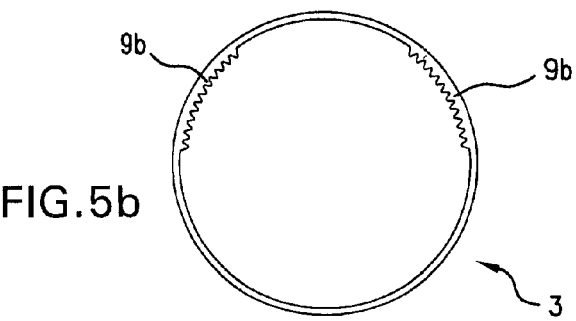
Figure 5C:
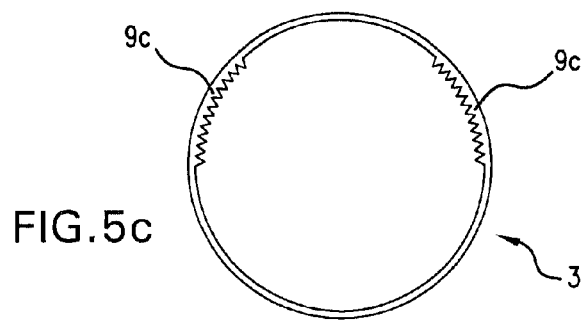
Figure 5D:
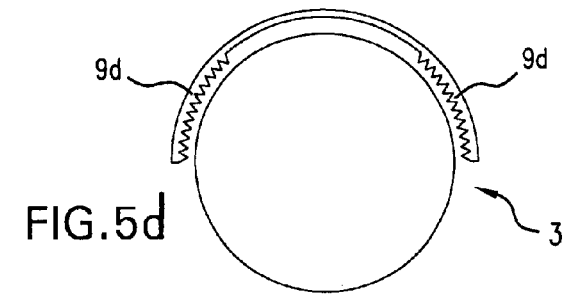

In FIG. 5a to 5d specific embodiments of tubular jacket 3 according to the invention are illustrated in cross section to show the structured elements 9a to 9d for focussing more radiation on absorber tube 4. Three tubular jackets 3 of FIGS. 5a, 5b and 5c have structural elements or structuring 9a, 9b, 9c only in a certain angular region. A lens-shaped structuring or lens-shaped structural elements 9a are shown in FIG. 5a. A prism-shaped structuring or prism-shaped structural elements 9b are shown in FIG. 5b. Zig-zag shaped structural elements 9c are shown in FIG. 5c. The structural elements shown in FIG. 5d, which are prism-shape, are provided on a foil 19 that is placed on the outside of the tubular jacket 3. In other embodiments the foil may be placed on the inside of the tubular jacket. These structural elements or structuring in these embodiments provide an optimized interceptor factor. The boundary surfaces are selected so that as great as possible focussing on the absorber tube is attained for a given incidence angle and mirror error.

Figure 6A:
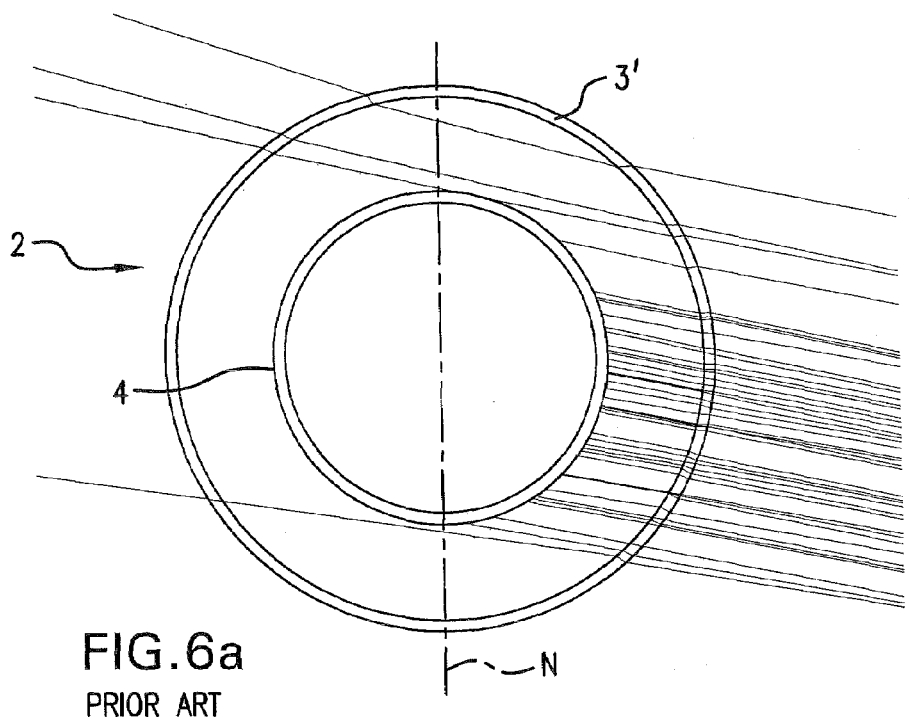
FIG. 6a is a schematic cross-sectional view through a receiver tube with a conventional tubular jacket, showing the path of peripheral rays.
Figure 6B:
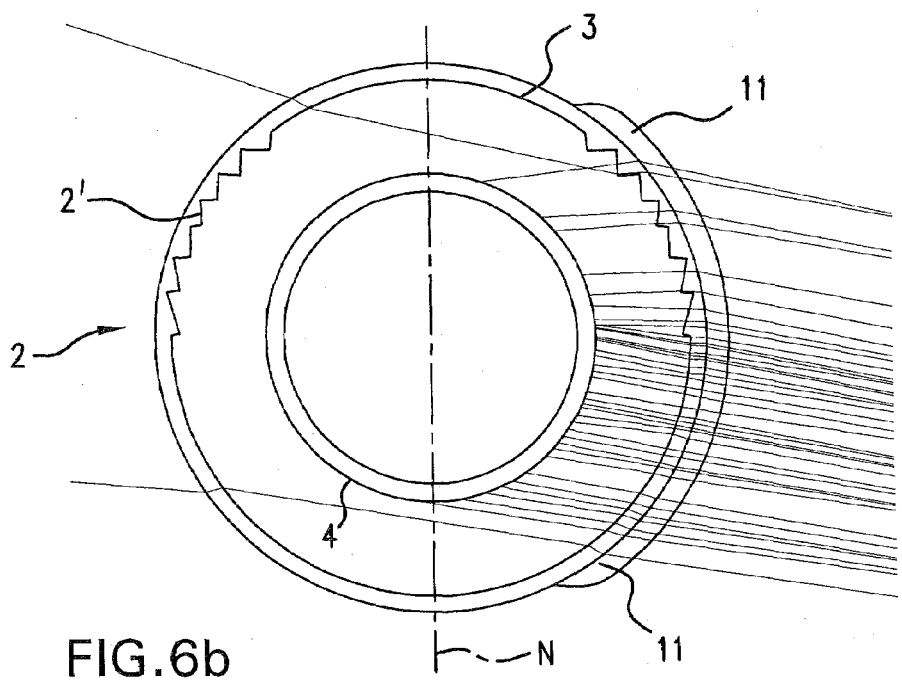
FIG. 6b is a schematic cross-sectional view through a receiver tube with a tubular jacket structured according to the invention, showing the path of radiation remote from the axis.

In FIG. 6a the path of rays is shown in a receiver tube 2 comprising a conventional glass tubular jacket 3 of a given thickness and an absorber tube 4. The ray path shown in FIG. 6a is for a beam that is comparatively far from the optic axis. Individual rays, which do not reach the absorber tube 4, occur especially in the part 3' of the tubular jacket 3 facing away from the mirror 1. Furthermore a gentle defocusing effect of the part 3' of the tubular jacket 3 is observed. It is caused by the given thickness of the tubular jacket 3 and by the difference between the index of refraction of glass and air or glass and vacuum. In the embodiment of FIG. 6b the tubular jacket 3 includes zig-zag structural elements 2' according to the invention, especially in the angular region 90° to 20° to the normal axis N. The zig-zag surface shape or profile, like an arrangement of prisms, acts on the incident radiation that is comparatively far from the axis so that a large part of the otherwise defocused incident radiation is guided to the absorber tube 4.

Figure 7A:
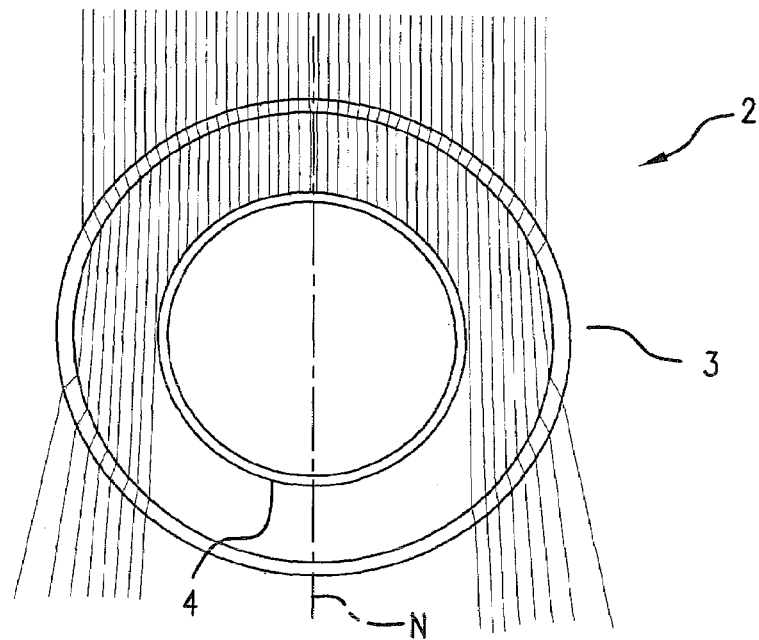
FIG. 7a is a schematic cross-sectional view through a receiver tube with a conventional tubular jacket, showing the path of radiation coming directly from the sun.
Figure 7B:
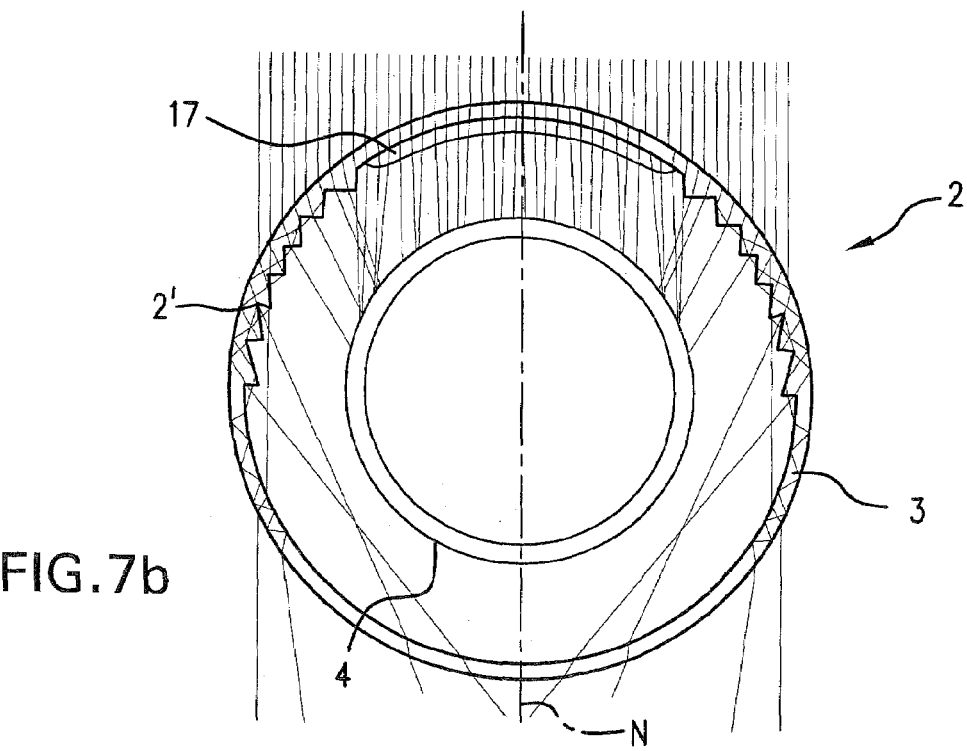
FIG. 7b is a schematic cross-sectional view through a receiver tube with a tubular jacket structured according to the invention, showing the path of radiation coming directly from the sun.

FIGS. 7a and 7b show the same arrangement as in FIGS. 6a and 6b, but for radiation which falls directly from the sun on the receiver tube 2 comprising the absorber tube 4 and the tubular jacket 3. The ratio of the radiation, which falls on the absorber tube 4 and which is deflected away from it, corresponds to the ratio of the cross-sectional areas in a longitudinal section through the absorber tube 4 and through the tubular jacket 3 (FIG. 6a). Furthermore the defocusing effect of the part 3' of the tubular jacket 3 on the normal radiation is especially clear. Of course even using the tubular jacket 3 according to the invention with the structured region not all rays are guided to the absorber tube 4. However the portion of the radiation incident on the tubular jacket 3 that reaches the absorber tube 4 can be significantly increased.

Figure 8A:
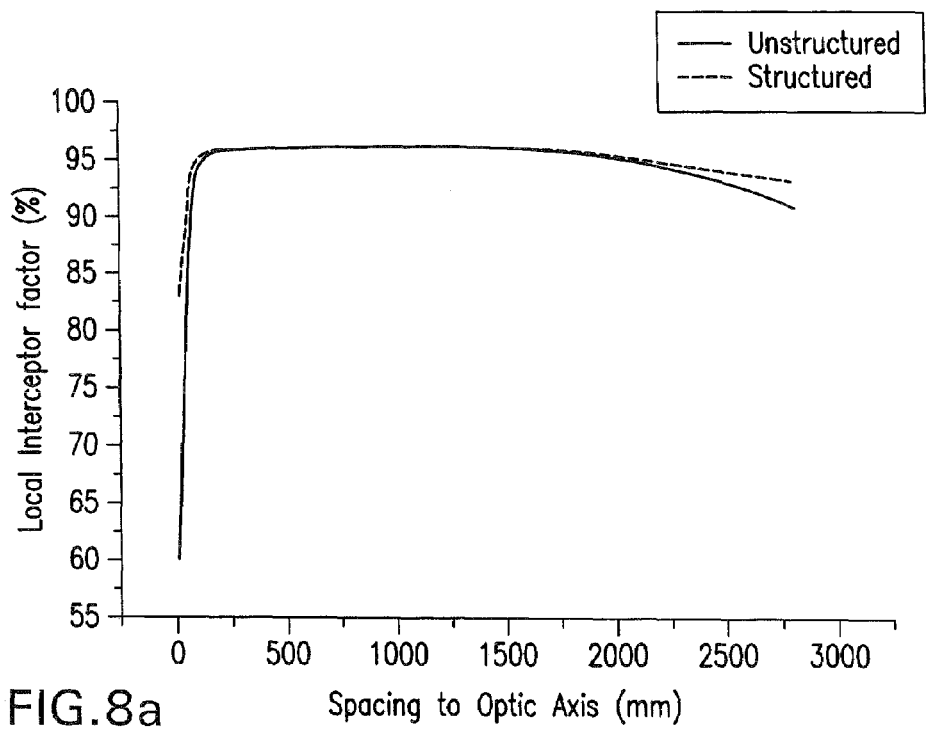
FIG. 8a is a graphical illustration of the variation of the dependence of local interceptor factor on distance from the optic axis in the case of the tubular jacket according to the invention.
Figure 8B:
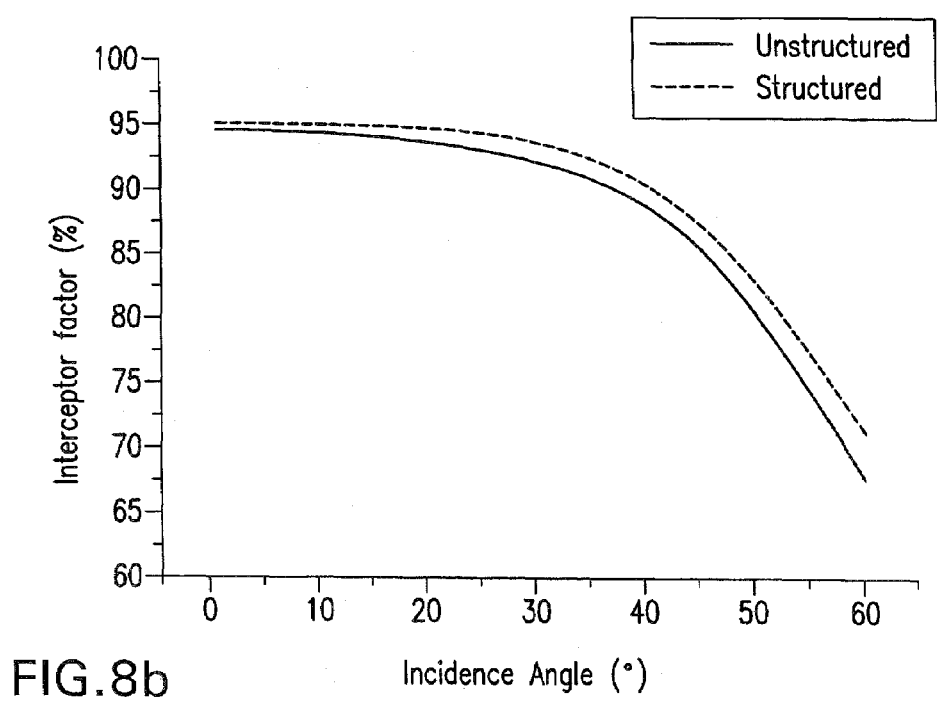
FIG. 8b is a graphical illustration of the dependence of interceptor factor on angle of incidence in the case of the tubular jacket according to the invention.

This effect is also clearly understandable with the help of the graphical illustrations in FIGS. 8a and 8b. FIG. 8a shows the dependence of the local interceptor factor in percent on the distance to the optic axis in millimeters. The solid curve corresponds to the curve obtained with a conventional or prior art unstructured tubular jacket. The dashed curve corresponds to the curve obtained using a tubular jacket with the focussing structural elements according to the invention. A definite increase of the interceptor factor for radiation coming directly from the sun (spacing to the optic axis of about 0 mm) and for radiation that is spaced in a region comparatively far, about 2000 mm, from the axis is observed. Also the interceptor factor is increased by the focussing structural elements in the tubular jacket between about 1% (incident angle between 0° and 10°) and about 3% (incidence angle between 50° and 60°).

In FIG. 9 a preferred arrangement of the receiver tube 2 comprising the absorber tube 4 and the tubular jacket 3 in relation to the parabolic mirror 1 is sketched. Conventionally the receiver tube 2 is arranged at the focal point F. According to the invention, in order to reduce the number of rays that miss the absorber tube by passing under the receiver tube 2, the receiver tube 2 (i.e. its center or the center of the absorber tube) is displaced from the focal point F in the direction of the parabolic mirror 1 by a distance equal to about half of the spacing d between the tubular jacket 3 and the absorber tube 2.

In certain embodiments the tubular jacket 3 may be provided with an antireflective coating on an inside surface 17 as shown in FIG. 7b and/or on an outside surface 11 as shown in FIG. 6b.

The disclosure in German Patent Application 103 05 428.6-15 of Feb. 3, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a tubular jacket for an absorber tube of a parabolic trough collector, a receiver tube of the parabolic trough collector and a parabolic trough collector, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A tubular jacket (3) for a parabolic trough collector, said parabolic trough collector comprising a parabolic mirror (1) having a focal point (F) and a normal axis (N) and a receiver tube (2) arranged at said focal point to receive solar radiation reflected from the parabolic mirror (1), said parabolic mirror (1) being arranged outside of said receiver tube (2) and said receiver tube (2) comprising the tubular jacket (3) and an absorber tube (4), said absorber tube being arranged inside the tubular jacket, wherein said tubular jacket (3) comprises a glass tube and structural elements (9a, 9b, 9c, 9d), said structural elements (9a, 9b, 9c, 9d) extend around said tubular jacket at least over respective angular ranges of 20° to 65° on opposite sides of said normal axis (N);

whereby said structural elements focus sunlight that falls directly on the receiver tube (2) from the sun but which would otherwise be deflected away from the absorber tube without the presence of said structural elements as well as sunlight that is reflected from the parabolic mirror but which would otherwise not reach said absorber tube without the presence of said structural elements on said absorber tube (4).

2. The tubular jacket as defined in claim 1, wherein said structural elements comprise a plurality of lenses (9a).

3. The tubular jacket as defined in claim 1, wherein said structural elements comprise a plurality of polyhedral segments (9b, 9c).

4. The tubular jacket as defined in claim 1, wherein said structural elements comprise a plurality of prisms (9b, 9c).

5. The tubular jacket as defined in claim 1, further comprising a structured foil mounted on an inner or outer side of the tubular jacket and wherein said foil includes said structural elements.

6. The tubular jacket as defined in claim 1, wherein said structural elements do not change in a longitudinal direction along the tubular jacket.

7. The tubular jacket as defined in claim 1, further comprising an antireflective coating (11,17) on at least one of an inside surface and an outside surface of the tubular jacket.

8. The tubular jacket as defined in claim 1, wherein said structural elements are lens-shaped and are provided by a wavy structuring of an inner and/or outer wall of the glass tube.

9. The tubular jacket as defined in claim 1, wherein said structural elements are prism-shaped and are provided by a zig-zag structuring of an inner and/or outer wall of the glass tube.

10. The tubular jacket as defined in claim 1, wherein said angular ranges are from 35° to 65° from said normal axis of the parabolic mirror and on said opposite sides of said normal axis.

11. A receiver tube (2) for a parabolic trough collector, said parabolic trough collector comprising a parabolic mirror (1) having a focal point (F) and a normal axis (N), which is arranged outside of said receiver tube so as to direct reflected light from the parabolic mirror on said receiver tube;

wherein said receiver tube is arranged at said focal point (F) of said parabolic mirror and comprises an absorber tube (4) and a tubular jacket (3) arranged around the absorber tube (4);

wherein said tubular jacket (3) comprises a glass tube and structural elements (9a, 9b, 9c, 9d);

wherein said structural elements (9a, 9b, 9c, 9d) comprise a plurality of lenses, prisms and/or polyhedral elements and said structural elements (9a, 9b, 9c, 9d) extend around said tubular jacket at least over respective angular ranges of 20° to 65° on opposite sides of said normal axis (N);

whereby said structural elements focus sunlight that falls directly from the sun on the receiver tube (2) but which would otherwise be deflected away from the absorber tube without the presence of said structural elements and focus sunlight that is reflected from the parabolic mirror (1) but which would otherwise not reach said absorber tube without the presence of said structural elements on said absorber tube arranged in the tubular jacket.

12. The receiver tube as defined in claim 11, wherein said tubular jacket comprises a foil (19) mounted on an inner or an outer side of the tubular jacket and wherein said foil includes said structural elements.

13. The receiver tube as defined in claim 11, wherein said tubular jacket comprises an antireflective coating (11,17) arranged on an outside surface and/or an inside surface of the tubular jacket.

14. The receiver tube as defined in claim 11, wherein said structural elements are lens-shaped and are provided by a wavy structuring of an inner and/or outer wall of the glass tube.

15. The receiver tube as defined in claim 11, wherein said structural elements are prism-shaped and are provided by a zig-zag structuring of an inner and/or outer wall of the glass tube.

16. The receiver tube as defined in claim 11, wherein said angular ranges are from 35° to 65° from said normal axis of the parabolic mirror and on said opposite sides of said normal axis.

17. A parabolic trough collector for solar energy, said parabolic trough collector comprising a parabolic mirror (1) having a focal point (F) and a normal axis (N); and a receiver tube (2) arranged at said focal point (F), said parabolic mirror (1) being arranged outside of said receiver tube (2) so that said normal axis (N) passes through said receiver tube (2);

in which said receiver tube (2) comprises a tubular jacket (3) and an absorber tube (4) arranged in the tubular jacket (3), said tubular jacket comprises a glass tube and structural elements (9a, 9b, 9c, 9d) that defract and/or deflect light, said structural elements comprising a plurality of lenses, prisms and/or polyhedral elements; and in which said structural elements (9a, 9b, 9c, 9d) extend around said tubular jacket at least over respective angular ranges of 20° to 65° on opposite sides of said normal axis (N);

whereby said structural elements (9a, 9b, 9c, 9d) are arranged around said tubular jacket so as to focus solar radiation that falls on the receiver tube directly from the sun but which would otherwise be deflected away from the absorber tube without the presence of said structural elements on the absorber tube and so as to focus solar radiation that is reflected from the parabolic mirror (1) but which would otherwise not reach said absorber tube without the presence of said structural elements on said absorber tube arranged in the tubular jacket.

18. The parabolic trough collector as defined in claim 17, wherein said corresponding angular ranges extend around said tubular jacket from 35° to 65° with respect to said normal axis and on said opposite sides of said normal axis.

19. The parabolic trough collector as defined in claim 17, wherein said structural elements are lens-shaped and are provided by a wavy structuring of an inner and/or outer wall of the glass tube.

20. The parabolic trough collector as defined in claim 17, wherein said structural elements are prism-shaped and are provided by a zig-zag structuring of an inner and/or outer wall of the glass tube.

21. The parabolic trough collector as defined in claim 17, wherein said receiver tube (2) is positioned in relation to said parabolic mirror (1), so that a center of said receiver tube (2) is displaced in a direction toward said parabolic mirror (1) from said focal point (F) by a distance equal to about half of a spacing (d) between said tubular jacket (3) and said absorber tube (4).

22. The parabolic trough collector as defined in claim 17, wherein said structural elements do not change in a longitudinal direction along the receiver tube (2).

23. The parabolic trough collector as defined in claim 17, further comprising a structured foil mounted on an outer side of the tubular jacket, and wherein said foil includes said structural elements.

* * * * *